United States Patent
Hage

(10) Patent No.: US 6,761,784 B1
(45) Date of Patent: Jul. 13, 2004

(54) TEMPORARY PROTECTIVE LAYER ON POLYMERIC ARTICLES

(75) Inventor: Martin L. Hage, Maple Grove, MN (US)

(73) Assignee: Vision-Ease Lens, Inc., Ramsey, MN (US)

( * ) Notice: Subject to any disclaimer, the term of this patent is extended or adjusted under 35 U.S.C. 154(b) by 0 days.

(21) Appl. No.: 09/305,586

(22) Filed: May 5, 1999

(51) Int. Cl.[7] .................. B32B 31/12; B65B 33/00; B65B 33/02; G02C 7/04
(52) U.S. Cl. ............. 156/155; 156/247; 156/249; 351/159; 351/166; 351/177; 427/155
(58) Field of Search ................. 156/247–249, 156/155; 427/154, 155; 351/159, 166, 177

(56) References Cited

U.S. PATENT DOCUMENTS

| | | | |
|---|---|---|---|
| 3,899,314 A | | 8/1975 | Siegmund |
| 3,899,315 A | | 8/1975 | Siegmund |
| 4,199,375 A | | 4/1980 | Müller |
| 4,645,317 A | | 2/1987 | Frieder et al. |
| 4,846,913 A | | 7/1989 | Frieder et al. |
| 4,857,553 A | | 8/1989 | Ward et al. |
| 4,867,553 A | | 9/1989 | Frieder |
| 4,883,548 A | | 11/1989 | Onoki |
| 5,130,353 A | * | 7/1992 | Fischer et al. ......... 156/247 X |
| 5,149,181 A | | 9/1992 | Bedford |
| 5,883,169 A | | 3/1999 | Spector et al. |
| 5,910,532 A | | 6/1999 | Schmidt et al. |
| 5,945,462 A | | 8/1999 | Salamon |
| 6,033,718 A | * | 3/2000 | Marias Albrich et al. ............ 427/154 X |
| 6,093,240 A | * | 7/2000 | Matsumura et al. |
| 6,106,889 A | * | 8/2000 | Beavers et al. ......... 427/155 X |

FOREIGN PATENT DOCUMENTS

| | | |
|---|---|---|
| EP | 0369581 | 5/1990 |
| EP | 0 819 744 A2 * | 1/1998 |
| GB | 2260937 A | 5/1993 |
| WO | 9523351 | 8/1995 |

* cited by examiner

Primary Examiner—Adrienne C. Johnstone
(74) Attorney, Agent, or Firm—Mark A. Litman & Associates, P.A.

(57) ABSTRACT

The temporary protection of polymeric articles, particularly polymeric articles with optical qualities such as ophthalmic lenses formed by the lamination of individual lens blanks, can be effected by the application of protective polymeric compositions to the surface of the polymer article, the composition being applied as a dry film or coating a film on a surface of the polymeric article. The individual lens blank is prepared for lamination or coating by application of a selective solvent to the polymeric film, the selective solvent dissolving, dispersing or otherwise removing the protective polymeric film but neither reacting with, etching or dissolving the composition of the polymeric article. The solvent even may comprise water or aqueous solutions (especially pH 8.0 to 12), although C1 to C5 alcohols and alkylene glycol ethers may also be used as the solvent.

18 Claims, No Drawings

TEMPORARY PROTECTIVE LAYER ON POLYMERIC ARTICLES

BACKGROUND OF THE INVENTION

1. Field of the Invention

The present invention relates to polymeric articles, particularly to ophthalmic lens blanks or wafers and more particularly to a method for protecting ophthalmic lens blanks or wafers, particularly polymer composition ophthalmic lens blanks or wafers by forming a solvent removable protective film thereon. The removable protective film is removable by application of a solvent to which the polymeric article is inert, such as with water or aqueous solutions.

2. State of the Art

Eyeglass lenses were originally manufactured as a single integral body of glass or plastic. The lenses were individually ground or molded to meet the specifications of a particular ophthalmic prescription. This is clearly a labor intensive process that required costly equipment, highly skilled technicians and required a significant amount of time to perform the tasks accurately.

Modem fabrication of ophthalmic lenses can be economically accomplished in a more rapid manner with a laminated lens construction wherein at least two lens wafers are bonded together with a transparent adhesive. Such lens wafers are described, for example, in U.S. Pat. Nos. 5,149,181; 4,846,913; 4,883,548; 4,867,553; 4,857,553; and 4,645,317 and British Patent Application, publication number 2,260,937A.

The laminate construction enables assembly of composite lenses having any of a large number of different combinations of optical corrections from a relatively small stock of prefabricated lens wafers of different configurations. Pairing of different combinations of a front surface lens wafer with a back surface lens wafer can, for example, provide composite lenses having any of a large number of different powers as the power of the lens is the summation of the powers of the two wafers. Such combinations provide for a large majority of all of the prescriptions required for clear vision. Additionally, the front or rear lens elements may have corrections for far-sightedness (a bifocal area) within one of the lenses. The multi-corrective lens may then be formed by combining (e.g., laminating or fusing) the appropriate combinations of blanks.

Notwithstanding the advantages of using lens wafers in the construction of a composite lens, a problem arises with the use of such lens wafers. Specifically, any contaminates such as dust, dirt, fingerprints and moisture found on the wafer surfaces to be glued may become permanently entrapped at the interface of the wafers in the composite lens upon adhesion of the front wafer to the back wafer resulting in defects in the lens, if those contaminants are not removed before lamination. This adds the potential for additional and significant undesirable work in the lamination of the lens blanks from the stored stock of lenses. These defects would reduce the optical quality of the finished lens and can ultimately lead to lens rejection.

To provide a defect-free composite lens, the wafer surfaces to be laminated together (with a transparent adhesive) should be substantially clean of such contaminates. However, since the wafers are invariably handled during composite lens fabrication, it is particularly difficult to avoid contaminants such as fingerprints and dust on the wafer surfaces. These are particularly undesirable on the surfaces that are laminated together as those contaminants would be permanently secured between the lenses and could not be removed after lamination of the lenses. Contaminants on the exterior surfaces of the finished lenses are not as worrisome as they may be cleaned from the lens by normal cleaning procedures after lamination of the at least two lens blank elements.

The ability to maintain a contaminant-free surface is also important if optical coatings such as anti-reflection layers, abrasion resistant layers, tints, polarizing layers, or ophthalmic coatings are to be applied. Again, any surface damage or contamination underneath added layers would be uncorrectable after application of the optical coating.

Previous methods known in the art neither address nor are applicable to this problem. For example, U.S. Pat. Nos. 3,899,315 and 3,899,314 relate to texture control of glass ophthalmic lenses by use of a protective layer which is removed prior to use. A flat glass lens preform is provided with a thin protective layer of a chemically soluble glass fused thereto. In the manufacturing process, the flat preform is subsequently cut and pressed or slumped to the desired ophthalmic shape and the protective layer subsequently removed by dissolving this in a corrosive reagent, thereby exposing the underlying surface which, while smooth, nevertheless needs to be cleaned. The lens is rendered immediately adaptable to ophthalmic use, without further working (grinding, polishing or cleaning) of the surface. This wet process, however, is not suitable for reagent sensitive molded plastic (e.g., polycarbonates or polymethacrylates) lenses. Furthermore, it has been found that the wet process does not provide a sufficiently clean surface on lens wafers required for laminated ophthalmic lenses.

Another approach to removing dust and grease from a polymer surface is disclosed in U.S. Pat. No. 4,199,375 which describes a method for removing dust and grease from phonograph records by applying a polyvinyl alcohol composition which forms a self-supporting film upon drying. When the film is lifted from the record, dust and grease, which are dissolved in the film, are removed. However, this composition, when applied to plastic lenses or lens wafers, forms films that are difficult to remove.

U.S. Pat. No. 5,883,169 describes a self-supporting removable film on the surface of a plastic lens wafer which does not cross-link to the wafer surface. The removable layer provides a method of cleaning the surface of the lens. Additionally, the removable film provides a level of abrasion protection to the underlying surface. The reference also describes a method of cleaning at least one surface of a lens wafer from contaminates which method comprises:

(a) applying a film forming composition onto at least one surface of a lens wafer, said composition comprising:
  (I) a film forming unmodified polymer, and
  (ii) a compatible solvent;
(b) removing the solvent from said composition to form a self-supporting removable film that coats the surface of the wafer to which it was applied without being cross-linked thereto which film encapsulates therein at least a portion of the contaminates found on the wafer surface prior to application of the composition thereto; and
(c) removing said film from the surface of the wafer. The film removal is shown as being provided because there is no chemical binding, whether covalent or ionic, between the film and the lens wafer so that the film is accordingly peelable.

SUMMARY OF THE INVENTION

The temporary protection of polymeric articles, particularly polymeric articles with optical qualities such as ophthalmic lenses formed by the lamination of individual lens blanks, can be effected by the application of polymeric compositions to the surface of the polymer article, the composition being applied as a film or forming a film on a surface of the polymeric article. The individual lens blank is prepared for lamination or coating by application of a selective solvent to the polymeric film, the selective solvent dissolving, dispersing or otherwise removing the polymeric film but neither reacting with or dissolving the composition of the polymeric article. The solvent even may comprise water or aqueous solutions, although C1 to C5 alcohols and alkylene glycol ethers or any blends of these solvents may also be used.

DETAILED DESCRIPTION OF THE INVENTION

Polymeric optical elements that are to be laminated are protected against abrasion and accumulation or entrapment of contaminants (e.g., dust, particulates, oils, greases, fibers, chemical spills, and the like) by the application of a polymeric film to at least one surface of the polymeric article, the polymeric film being capable of being dissolved from the surface of the polymeric article by a solvent to which the polymeric article is substantially inert or insoluble. This protection is especially important with respect to ophthalmic lens blanks manufactured from polycarbonates that are subject to scratching during handling or mechanical treatment prior to lamination. The polymeric film must be provided from a coating composition (solution, dispersion, emulsion) that has no solvents which are active against the polymeric optical element during the application of the coating composition and during the period when the protective coating is retained against the surface of the polymeric optical element. It is usually found that a solvent in which the composition of the polymeric optical element will not dissolve in an amount of 0.5%, preferably less than 0.1% and less than 0.01% (essentially insoluble) is particularly desirable. It is also desirable that the solvent in the coating composition does not migrate from the coating composition into the polymeric optical element in an amount of more than 0.5% by weight of the polymeric optical element, preferably less than 0.1%. The polymeric film must comprise a different chemical composition than that of the polymeric article, but may be within the same chemical class. For example, the polymeric article may comprise a cross-linked acrylic resin (which is not water-soluble or water-softenable or water-dispersible) and the polymeric film may comprise a water-soluble or water-dispersible acrylic resin. In the field of ophthalmology and optical lenses, the range of useful chemical compositions is relatively limited to polycarbonates, acrylic or allylic resins, acetates and in some cases polyurethanes. The solvent-soluble polymeric film materials may comprise water-soluble or water-dispersible films, for example, selected from the group consisting of acrylic resins, polyvinyl resins (e.g., poly(vinyl alcohol), poly(vinylpyrrolidone), and the like), polyurethanes, polyesters, maleic anhydride copolymers, and other resins, usually resins that have been modified by the inclusion of hydrophilic groups onto the polymer backbone as linking groups or as pendant groups. Such hydrophilic groups would include, for example, such backbone groups as oxyethylene groups, and such pendant groups as basic groups (e.g., OH, amine, etc.) or pendant groups such as acidic groups or salts (e.g., alkali metal salts) of the acidic groups (e.g., carboxylic acid, alkali metal salts of carboxylic acids, carboxylic ester, sulfonic acid, alkali metal salts of sulfonic acid, sulfonate, sulfinic acid, phosphoric acid, phosphonic acid, sulfonamido, and the like). These classes and types of polymers are widely available on a commercial basis and/or their synthesis or conversion is well reported in the literature. The major polymeric component does not have to be, by itself, water-soluble or water-dispersible, but rather the properties of the film formed with the polymeric composition (i.e., the properties of the layer itself) must be at least water-dispersible or dispersible/soluble in a solvent that does not dissolve or attack the composition of the ophthalmic lens. This can be effected in a number of art recognized means. For example, an insoluble or slightly soluble polymer may be blended with a water-soluble or water-dispersible component. For example, a water insoluble polymer may be blended with soluble inorganic materials (e.g., salts), natural organic materials (e.g., sugars, natural water-soluble polymers) or synthetic organic materials (e.g., synthetic water-soluble polymers, microcrystalline cellulose, metal salts of organic acids, etc.) to provide a film that will readily disperse (e.g., with wash agitation or spray washing) in the appropriate solvent, especially water or mild aqueous solutions. Materials that can assist in the ready dispersion of the coating are well known in the pharmaceutical field, where polymeric coatings are applied to the surface or interlayers of tablets to enhance their rate of dissolving. The layers are often provided with mixtures of water-soluble materials such as sugars (e.g., maltose, dextrose, sucrose, lactose), cellulosic derivatives (hydroxymethyl cellulose, hydroxypropyl cellulose, microcrystalline cellulose), metal salts of organic acids (e.g., magnesium stearate, calcium stearate, aluminum stearate, and salts of other carboxylic acids, particularly aliphatic carboxylic acids), plasticizers (e.g., triethyl citrate, polyoxyalkylene oxide group containing materials, etc.) and other excipients known in the pharmaceutical trade. By including from about 1 to 70% by weight of the coating composition as these water-soluble or water-dispersible components, with a water-insoluble or only slightly water-soluble component, the properties of the coating may be designed and tailored to provide the level of water-dispersibility needed for the practice of the present invention, without the major polymeric component or every component within the layer being water-soluble or water-dispersible when independently viewed. Individual classes of polymers may also be modified by incorporation of more water soluble or water-dispersible groups into the polymer chain, such as the introduction of polyethylene oxide groups or pendant quaternary ammonium groups into the backbone of the polymer during polymerization.

The process may be practiced wherein the film comprises a polymer selected from the group consisting of acrylic polymers, polyester polymers, polyurethane polymers, polyvinyl resins, and cellulose based polymers.

In another of its method aspects, this invention is directed to a method for reducing defects at the interface of front and back lens wafers in a laminated lens wherein the front and back lens wafers are bonded together at the surfaces interfacing with each other with a transparent adhesive which method comprises:

(a) applying a film forming composition onto the interface surfaces of at least one or both the front and back lens wafers, said composition comprising:

(I) a film forming polymer that is soluble in an amount of at least 10% by weight in a solvent that does not solvate or attack polycarbonate resin (e.g., a polycarbonate derived from bisphenol A and phosgene, e.g., any commercial grade of optical quality polycarbonate;

(b) drying the film forming composition to form a protective film coating on at least one surface of the ophthalmic lens blank. The lens blank may then be prepared for laminating with another lens blank by washing with a solvent that does not attack the underlying polycarbonate in the time frame in which the protective film coating is washed or dissolved from the surface;

(c) the dried protective film coating is then removed from the surface of the wafer; the removal is preferably by washing (e.g., spraying, immersion, bathing, scrubbing, or other form of active contact) the lens with a solution that will dissolve the protective coating but will not attack, dissolve, warp, distort or otherwise optically damage the wafer or the wafer surfaces that are contacted by the solvent. The preferable solvents may comprise solutions that include, for example, water, aqueous solutions, aqueous alkaline solutions, methanol, ethanol, propanol (and its isomers, e.g., isopropyl alcohol), butanol (and its isomers), alkylene glycol ethers (e.g., ethylene glycol ethers, propylene glycol ethers), and the like;

(d) after washing the lens wafer surface, a transparent adhesive may be applied to at least one of said interface surfaces (e.g., by liquid or dry film application); and (e) then the front lens wafer is bonded to the back lens wafer through the interface surfaces of said wafers to form a laminated lens.

Particular examples of classes of polymers that perform well as the protective film forming compositions of the present invention comprise acrylic and polyester polymers with relatively high acid values. A good cut-off point for efficient aqueous removal is for acid values of greater than or equal to 100, while better or easier water removal may be achieved with no loss of film protective properties with acid values of $\geq 150$, $\geq 175$, and $\geq 200$. The term "acid value" is a measure of the amount of free acid present in the polymer and is measured as the number of milligrams of potassium hydroxide needed to titrate or neutralize the acid groups in one gram of the polymer in solution to a neutral or basic phenolphthalein observation (color change) end-point. Where the wash-off solution is intended to have a more active compositions (e.g., higher pH or lower pH), the solubility properties of the composition may be likewise adjusted. For example, with a wash solution comprising a alkaline aqueous wash of water and ammonium, potassium hydroxide, or sodium hydroxide, acrylic polymers or polyesters having acid values of 25–50 would be useful. If the polymer had more basic substituent components, a more acidic wash bath could be used for removal of the temporary protective lens coating. Similarly, wash-off solutions having alcohol or glycol ether components would be more aggressive towards the coating, not attack the lens material, and could be used with lower acid weight polymer and less readily dispersible compositions.

The polymer of the protective coating layer should have a significant and effective solubility in a solvent that is not active against the polymeric material of the polymeric optical element (e.g., polycarbonate). That significant solubility should be at least 10% by weight of the polymer in the coating composition being soluble in the solvent at room temperature. Elevated temperatures or ultrasound may be used with the solvent to improve the wash effect and solubility, but it is more economical to operate at room temperature. The solubility of the polymer may of course be higher, with solubility levels of at least 20% by weight, at least 30% by weight, or higher.

The polymer coating may be applied in any manner, as the control over the thickness of the layer has minimum effect upon the protection benefits. It is merely necessary that all exposed surfaces of the face(s) of the lens wafers or blanks that are to be coated are continuously coated, without leaving any areas of the polymeric optical element surface exposed to potential contamination or damage.

Conventional methods such as dip-coating, spray coating, brush coating and roller coating may be used, and it is not necessary to use complex and detailed coating methods such as vapor deposition, sputtering, curtain coating, meniscus coating, and the like. Likewise the physical properties of the protective polymeric film have a wide range of tolerance. The protective films themselves do not require any significant abrasion resistance, and may be more sacrificial in nature. As long as the protective film will not be exposed to any sharp objects or cutting tools that might penetrate the thickness of the protective film, the protective coating layer may be relatively soft, as with polyvinyl alcohol or polyvinyl pyrrolidone. The strength of the adherence of the protective film to the polymeric optical element is also of only modest importance. The water soluble or water-dispersible polymeric protective film may be peelable from the polymeric optical element or may be more strongly attached thereto. The only limitations on the bond strength of the protective film to the polymeric optical element would be that the protective film should not chemically bond to the optical element so that it cannot be removed by the solvent wash and that the film maintains sufficient strength of bonding that it does not freely fall off the surface when the coated polymeric optical element is lifted.

The ophthalmic lens blanks do not have to be perfectly smooth or planar or curved on each surface to benefit from the practice of the present invention. The lens surfaces may have recessed or protruding features on them such as bifocal power segments, tabs, indentations, grooves, and the like which could not be used with a peel-apart system, as that would not conform to these features easily and would be difficult to remove. This is another significant advantage to the use of a coating solution to form a solvent removable protective layer. Mild agitation of the wash solution would easily remove the protective coating from the edges of the features, while a strippable or peelable protective layer would neither conform easily to significant features on a surface of the lens (therefore nor offering complete protection) or else be removed with significant difficulty if the peal-apart film did conform precisely with the features. The process may be practiced wherein the first solvent used to remove the protective layer is different from the solvent (the coating solvent) used to coat the protective layer onto the surface of the lens.

EXAMPLES

A coating solution comprising an at least water-dispersible, high acid value (between 250 and 275) commercially available, water-soluble acrylic copolymer was provided as an aqueous/methanol coating solution of 2500 grams of SCX 1185 (a water-soluble acrylic resin, the sodium salt of a polymer having an acid value above 250) and 12,500 grams methanol. The solution was maintained in a tray. A Polycarbonate (OQ 3820-1111, Lexan(R) Code Number) ophthalmic lens blank manufactured by BMC Vision-Ease Lens of Ramsey, Minnesota was dipped into the tray of polymer solution and air dried at room temperature. Drying may also be done in a forced air oven, e.g., in a convection oven at 150 degrees F for five minutes. A continuous, clear coating of polymer was present over all surfaces of the ophthalmic lens blank. The dried, coated ophthalmic lens blank was examined, and no visible damage or particles were noticeable within the coating. The lens was washed with deionized water at room temperature with mild agitation, then air dried in a relatively dust free environment. Upon visual examination, no oil smudges, prints, or particulate matter appeared on the surface of the lens. The coated lens has a very safe storage life of greater than a year at room temperature. The coating may also be dried at room temperature and can be removed in flowing deionized water in about ten seconds. Additional cleaning is not essential, but may be performed after the film removal. Tap water or mild alkaline solutions may be used, although deionized water is preferred. Because of the potential for non-reactive coating compositions, e.g., dispersions or solutions of polymers, the coating compositions also may be provided with extensive shelf life.

The coated lens blank could be handled manually, by tongs, or by other mechanical apparatus without likelihood of any actual permanent damage to the lens.

What is claimed:

1. A process for manufacturing laminated polymeric optical elements comprising:
   a) applying to at least one surface of a first polymeric optical element a first solvent-soluble or first solvent dispersible film, wherein said first polymeric optical element is not soluble in said first solvent;
   b) removing said film from said first polymeric optical element by contacting the film with said first solvent which dissolves or disperses said film; and
   c) laminating said first polymeric optical element to a second polymeric optical element to form a laminated polymeric optical element;
   wherein said first polymeric optical element and said second polymeric optical element are wafer components for an ophthalmic lens, and wherein said film comprises a polymer having an acid value greater than or equal to 100.

2. The process of claim 1 wherein said first solvent is water or an aqueous liquid.

3. The process of claim 1 wherein said first solvent is water.

4. The process of claim 3 wherein said film is applied to said first polymeric optical element by applying a liquid coating composition to said at least one surface and then drying said coating composition to form said film.

5. The process of claim 1 wherein said film is applied to said first polymeric optical element by applying a liquid coating composition to said at least one surface and then drying said coating composition to form said film.

6. The process of claim 1 comprising:
   a) applying to at least one surface of a first polymeric optical element and a second polymeric optical element a first solvent-soluble or first solvent dispersible film, wherein said first polymeric optical element and said second polymeric optical element are not soluble in said first solvent;
   b) removing said film from said first polymeric optical element and said second polymeric optical element by contacting the film with said first solvent which dissolves or disperses said film; and
   c) laminating said first polymeric optical element to said second polymeric optical element to form a laminated polymeric optical element.

7. The process of claim 6 wherein said film comprises a polymer selected from the group consisting of acrylic polymers, polyester polymers, polyurethane polymers, polyvinyl resins, and cellulose based polymers.

8. The process of claim 6 wherein said polymer is an acrylic or polyester polymer.

9. The process of claim 6 wherein the first solvent is an aqueous solvent.

10. The process of claim 6 wherein the first solvent is water.

11. The process of claim 6 wherein the first solvent is an aqueous solution.

12. The process of claim 6 wherein said film comprises a polymer selected from the group consisting of acrylic polymers, polyester polymers, polyurethane polymers, and polyvinyl resins.

13. The process of claim 1 wherein said film comprises a polymer selected from the group consisting of acrylic polymers, polyester polymers, polyurethane polymers, polyvinyl resins, and cellulose based polymers.

14. The process of claim 1 wherein said polymer is an acrylic or polyester polymer.

15. The process of claim 1 wherein said first solvent-soluble or solvent dispersible film is applied to said first polymeric optical element from a solution or dispersion in a coating solvent.

16. The process of claim 15 wherein said first solvent is different from said coating solvent.

17. The process of claim 1 wherein at least one of said wafer components for an ophthalmic lens has a surface feature on a major surface of a wafer component, said surface feature being selected from the group consisting of tabs, grooves, notches, and recessed power segments.

18. The process of claim 1 wherein said film comprises a polymer selected from the group consisting of acrylic polymers, polyester polymers, polyurethane polymers, and polyvinyl resins.

* * * * *